United States Patent [19]
Maskell et al.

[11] Patent Number: 5,473,734
[45] Date of Patent: Dec. 5, 1995

[54] METHOD AND APPARATUS FOR EXPOSURE CALIBRATION IN RECORDING DEVICES

[75] Inventors: David Maskell, Oberursel; Hans-Henning Thiessen, Kelkheim, both of Germany

[73] Assignee: Linotype-Hell AG, Eschborn, Germany

[21] Appl. No.: 19,415

[22] Filed: Feb. 18, 1993

[30] Foreign Application Priority Data

Feb. 18, 1992 [DE] Germany .......................... 42 04 838.9
Feb. 4, 1993 [DE] Germany .......................... 43 03 081.5

[51] Int. Cl.$^6$ .................................................. H04N 1/23
[52] U.S. Cl. .................................................. 395/109
[58] Field of Search ............................ 395/101, 109, 395/128, 132; 358/75, 121, 139, 296, 504, 515

[56] References Cited

U.S. PATENT DOCUMENTS

| | | | |
|---|---|---|---|
| 3,657,472 | 4/1972 | Taudt et al. .......................... | 178/6.7 R |
| 4,206,475 | 6/1980 | Taudt et al. .......................... | 358/78 |
| 4,482,252 | 11/1984 | Lorenz .................................. | 356/448 |
| 4,814,791 | 3/1989 | Ohara et al. .......................... | 346/108 |
| 4,846,577 | 7/1989 | Grindon ................................ | 356/376 |
| 4,956,703 | 9/1990 | Uzuda et al. .......................... | 358/76 |
| 5,157,482 | 9/1992 | Cosgrove .............................. | 358/54 |
| 5,170,257 | 12/1992 | Burns .................................... | 358/298 |
| 5,172,224 | 12/1992 | Collette et al. ...................... | 358/80 |
| 5,204,761 | 4/1993 | Gusmano .............................. | 358/461 |
| 5,245,443 | 9/1993 | Burns .................................... | 358/298 |
| 5,249,242 | 9/1993 | Hanson et al. ...................... | 382/54 |
| 5,257,097 | 10/1993 | Pineau et al. ...................... | 358/500 |
| 5,313,283 | 5/1994 | Rice et al. .......................... | 358/350 |

OTHER PUBLICATIONS

Linotype Series 2000/Graphics 2000 User Manual. Mar. 1989.
Calibration Utility for Linotype Imagesetter Version 1.0, 1989.
Linotype Company—Calibration Utility—Product Information, 1990.
Linotype—"Scanned Color", Section 2.1 Calibration, 1990.

*Primary Examiner*—Mark R. Powell
*Assistant Examiner*—Gabriel I. Garcia
*Attorney, Agent, or Firm*—Hill, Steadman & Simpson

[57] ABSTRACT

A method and apparatus for exposure calibration of a recording device for pixel-by-pixel and line-by-line exposure of rastered areas on a recording material. A correction function (transfer function) is calculated, and picture signal values that are to be recorded, and which represent nominal gray scale values, are corrected according to the correction function so that the real gray scale values that are recorded correspond to the nominal gray scale values. For calculating the transfer function, check rasters having line patterns are exposed pixel-by-pixel and line-by-line on the recording material and the surface coverage values of the developed check rasters are measured. Relative increases in the optical density of the check raster are calculated from the measured surface coverage values. The effective increase in optical density of a dot or picture element is calculated from the relative increases in optical density of the check raster, taking the raster parameters provided for the recording into consideration. Subsequently, an increase in the optical density function is calculated for the nominal gray scale values of the gray scale range and the transfer function is calculated from the increase in the optical density function.

18 Claims, 4 Drawing Sheets

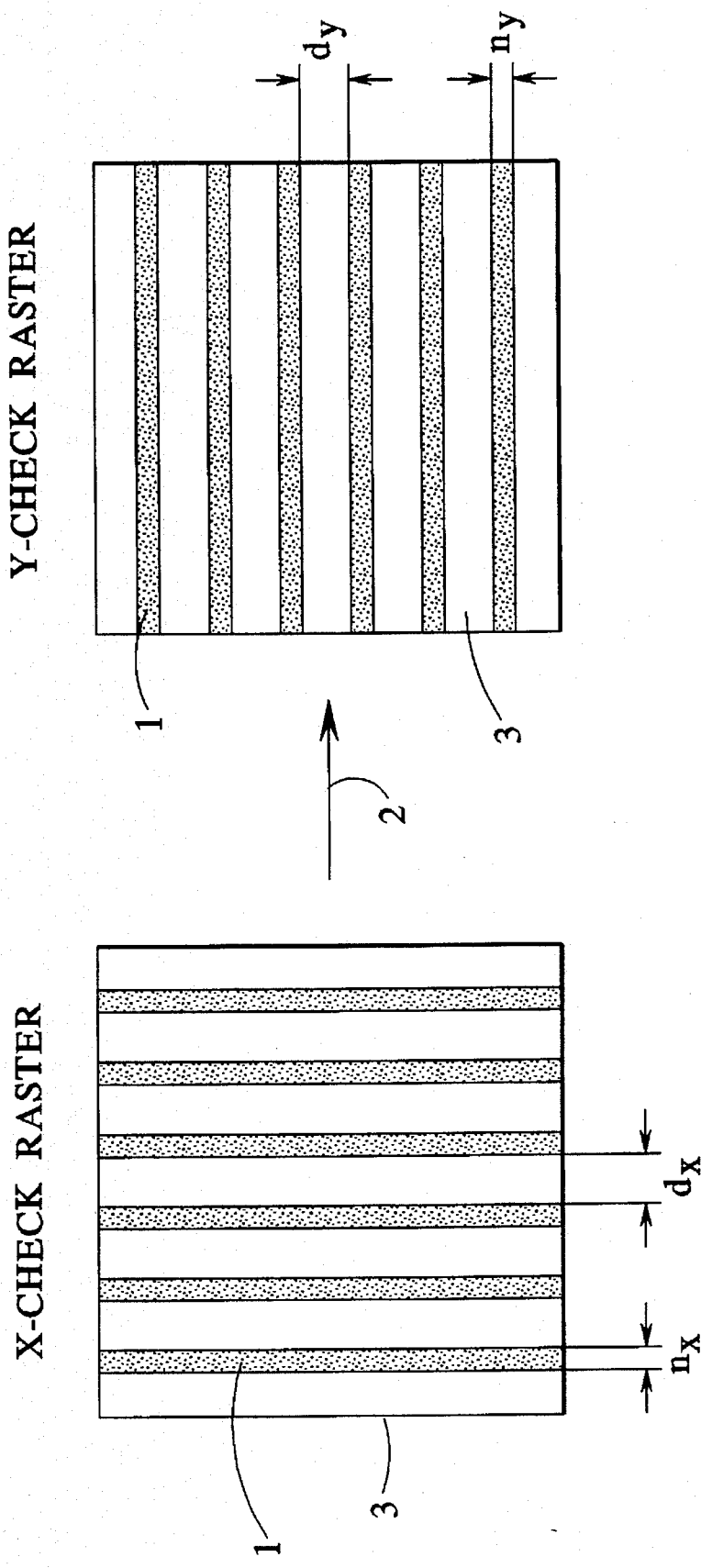

X-OPTICAL DENSITY INCREASE

X-CHECK RASTER

Y-CHECK RASTER

Y-OPTICAL DESITY. INCREASE

METHOD AND APPARATUS FOR EXPOSURE CALIBRATION IN RECORDING DEVICES

BACKGROUND OF THE INVENTION

The invention is directed to the field of electronic reproduction technology and concerns a method for exposure calibration of recording devices for the pixel-by-pixel and line-by-line exposure of rastered surfaces such as pictures or color separations on a recording material with at least one exposure beam generated in an exposure unit. The invention is also directed to an apparatus for the implementation of the method. A recording device of this type is also called an exposer, printer, or recorder.

For example, the recording device can be a color separation recorder for producing rastered color separations for multicolor printing with which rastered color separations "yellow", "cyan", "magenta" and "black" are exposed point-by-point and line-by-line. Disturbing Moiré phenomena can occur given superimposed printing of the color separations to produce a multicolor print. In order to avoid these Moiré phenomena, the individual color separations are exposed with rasters having different screen angles and/or screen widths. For example, the color separation "yellow" is exposed with a screen angle of 0°, the color separation "cyan" is exposed with a screen angle of +15°, the color separation "magenta" is exposed with a screen angle of −15°, and the color separation "black" is exposed with a screen angle of 45°.

A raster is composed of a plurality of periodically repeating raster meshes or raster cells in which raster points (raster spots) having different sizes are generated dependent on the gray scale values (tonal values) to be reproduced. Every raster point within a raster mesh is composed of pixels or picture elements that are recorded with the exposure beam. The respective ratio between the area of the raster mesh and the area of the raster point recorded in the raster mesh, referred to as degree of surface coverage, defines the reproduced gray scale value.

In such a color separation recorder, the picture signal values that represent the gray scale values to be recorded are supplied to a raster generator wherein the picture signal values are converted into corresponding control signal values for the exposure unit according to a raster function which is also referred to as a spot function. The control signal values switch the exposure beam on and off during a point-by-point and line-by-line relative motion between exposure beam and recording material, and thus determine what pixels are exposed or not as parts of the raster points on the recording material. The raster function thereby defines the size of the raster points dependent on the gray scale values to be recorded and also defines the shape of the raster point. In most cases, the relative motion between exposure beam and recording material occurs on the basis of a continuous or step-by-step conveying of the recording material in a conveying direction that is directed perpendicular to the line direction. For example, the exposure beam is a laser beam that is switched on and off with a modulator input with control signal values. The exposure unit can be designed such that it generates one exposure beam or a plurality of exposure beams lying side-by-side.

For example, DE-A-28 27 596 (U.S. Pat. No. 4,499,489) discloses a rastering method for recording color separations with rasters having arbitrary screen angles and/or screen widths.

When recording rastered pictures and color separations, the real raster point sizes or gray scale values (actual gray scale values) in fact generated on the recording material deviate from the desired, nominal gray scale values (rated gray scale values), since every pixel and thus every raster point is recorded more or less enlarged. The cause for the enlargement of the pixels is a halo that forms around every pixel and that is dependent on the intensity of the exposure beam. The difference between the gray scale values that are in fact generated and the nominal gray scale values is referred to as an increase in optical density, or is also referred to as increase in gray scale value.

Since an increase in optical density leads to disturbing changes in the tonal values of the reproduction compared to the original, the increase in optical density is compensated in practice in that a correction curve, also referred to as a transfer curve, is calculated by an exposure calibration in a calibration phase preceding the actual exposure, and the picture signal values that represent the nominal gray scale values are corrected according to the transfer curve during the exposure such that the gray scale values recorded in fact correspond to the nominal gray scale values.

Various parameters such as type of recording device, resolution of the recording device, density setting of the recording material respectively employed and the raster parameters such as raster function, screen width (screen frequency) and screen angle respectively employed must be taken into consideration in an exposure calibration.

In a traditional exposure calibration, a new, current transfer curve must be calculated over the entire calibration process, given modification of only one of these parameters. This necessity proves especially disadvantageous with respect to the raster parameters, since these are frequently changed. Given density measurements to be undertaken manually, involved and time-consuming calibration processes must be implemented in practice, the recording device thus not being available for useful exposures during these calibration processes.

SUMMARY OF THE INVENTION

It is therefore an object of the present invention to specify a method for exposure calibration of a recording device as well as an apparatus for the implementation of this method with which a nearly automatic execution can be implemented with greater calibration precision in a shorter time, with less expense, and with which the operator is relieved of routine jobs.

This object is achieved according to the invention in that

—a check raster (X-check raster; Y-check raster) representing at least one nominal gray scale value ($G_{xRated}$; $G_{yRated}$) is exposed pixel-by-pixel and line-by-line on the recording material provided for the later recording, the check raster being exposed for the actual exposure;

—the real gray scale values ($G_{xActual}$; $G_{yActual}$) of the check rasters exposed on the recording material are measured as surface coverage values;

—the overall increases in optical density ($S_{xControl}$; $S_{yControl}$) that have arisen in the exposed check rasters are calculated from the real gray scale values ($G_{xActual}$; $G_{yActual}$) of the check rasters and from the nominal gray scale values ($G_{xRated}$; $G_{yRated}$);

—the relative increases of optical density ($S_{xRel}$; $S_{yRel}$) of at least one pixel 5 are acquired from the overall increases in optical density ($S_{xControl}$; $S_{yControl}$) of the check rasters;

—the effective overall increases in optical density ($S^*_{Eff}$) of the raster points allocated by the raster function are calculated for nominal gray scale values ($G_{Rated}$) of the entire gray scale range between black and white, these increases being calculated from the relative increases in optical density ($S_{xRel}$; $S_{yRel}$) of a pixel 5 of the check raster, taking the raster parameters (screen width, screen angle, raster function, positive/negative recording) provided for the later, rastered recording into consideration;

—the increase in optical density function $S^*_{Eff} = f_S(G_{Rated})$ is calculated from the effective overall increases in optical density ($S^*_{Eff}$) that are acquired; and —the correction function (transfer function) $G_{Cor} = F_T(G_{Rated})$ for the compensation of the increase in optical density in the later exposure of the rastered surfaces being acquired by conversion from the increase in optical density function $S^*_{Eff} = f_S(G_{Rated})$.

It is provided that the check rasters are exposed on the recording material in the form of line patterns.

The lines 1 of a first check raster (X-check raster) proceed transversely relative to the line direction 2, preferably perpendicularly to the line direction 2, and the lines 1 of a second check raster (Y-check raster) proceed in line direction 2.

The nominal gray scale value ($G_{xRated}$; $G_{yRated}$) represented by a check raster is respectively defined by the ratio of the thickness ($n_x$; $n_y$) of a line 1 of the check raster to a line interval ($d_x$; $d_y$).

It is expedient that the nominal gray scale values ($G_{xRated}$; $G_{yRated}$) represented by the check rasters correspond to surface coverage values in a range from 20% through 40% of the theoretically possible surface coverage values from 0% (white) through 100% (black). A surface coverage value of 25% is advantageous.

It has proven expedient to construct every line 1 of the check raster from at least one pixel row 4.

Every line 1 of the check raster preferably has a thickness n perpendicular to the line direction of two to three pixel rows 4 or pixels 5.

An advantageous development of the method is comprised therein that the overall increase in optical density ($S_{xControl}$; $S_{yControl}$) that has arisen in the exposed check rasters is separately identified in line direction 2 and perpendicularly thereto, in that the overall increase in optical density ($S_{xControl}$) in line direction 2 is calculated from the broadening of the lines 1 of the X-check raster and the overall increase in optical density ($S_{yControl}$) perpendicular to the line direction 2 is identified from the broadening of the lines 1 of the Y-check raster.

It is provided that the overall increases in optical density ($S_{xControl}$; $S_{yControl}$) are calculated from the real gray scale values ($G_{xActual}$; $G_{yActual}$) and from the nominal gray scale values ($G_{xRated}$; $G_{yRated}$) according to the following equations:

$$S_{xControl} = (G_{xActual} - G_{xRated})/G_{xRated}$$

$$S_{yControl} = (G_{yActual} - G_{yActual})/G_{yActual}$$

It is also provided that the relative increases in optical density ($S_{xRel}$; $S_{yRel}$) of a pixel 5 is calculated with the assistance of a correction factor that takes the thickness ($n_x$; $n_y$) of the lines 1 of the check raster into consideration, being calculated from the overall increases in optical density ($S_{xControl}$; $S_{yControl}$) of the check rasters according to the following equations:

$$S_{xRel} = S_{xControl} * \text{Line Thickness } n_x$$

$$S_{yRel} = S_{yControl} * \text{Line Thickness } n_y$$

The method has a further advantage improvement wherein the effective overall increase in optical density ($S^*_{Eff}$) of the raster points is calculated from the relative increases in optical density ($S_{xRel}$; $S_{yRel}$), taking the raster parameters provided for the later, rastered recording into consideration, and wherein —the corresponding raster point is generated from pixels 5, the pixels 5 being arranged in pixel rows 7 oriented in line direction 2 and perpendicularly thereto;

—the effective increases in optical density ($S^*_{xEff}$; $S^*_{yEff}$) of the raster point are identified from the increases in optical density of the individual pixel rows 7 and from the relative increases in optical density ($S_{xRel}$; $S_{yRel}$) of a pixel 5 by averaging and taking the respective screen angle ($\beta$) into consideration; and —the effective overall increase in optical density ($S^*_{Eff}$) of the raster point is calculated by addition of the effective increases in optical density ($S^*_{xEff}$; $S^*_{yEff}$).

It has proven advantageous that the effective increases in optical density ($S_{xEff}$; $S_{yEff}$) of the raster points are respectively calculated from the increases in optical density of the individual pixel rows 7 and from the relative increases in optical density ($S_{xRel}$; $S_{yRel}$) with the assistance of shape factors ($r_x$; $r_y$ or, respectively, $r^*_x$; $r^*_y$) which take the averaging and, potentially, the respective screen angle ($\beta$) into consideration, being calculated according to the following equation:

$$S^*_{yEff} = S_{xRel} * r^*_x$$

$$S^*_{yEff} = S_{yRef} * r^*_y,$$

whereby the shape factors ($r^*_x$; $r^*_y$) potentially take the respective screen angle ($\beta$) into consideration in the following way:

$$r^*_x = (r_y * \text{angle}/90°) + r_x * (1 - \text{angle}/90°)$$

$$r^*_y = (r_x * \text{angle}/90°) + r_y * (1 - \text{angle}/90°)$$

with angle=screen angle ($\beta$) modulo 90°, and whereby the shape factors ($r_x$; $r_y$) which take the averaging into consideration, are respectively calculated from the plurality of pixel rows 7 in line direction 2 and perpendicularly thereto and from the plurality of pixels 5 that devolve onto the raster point, being calculated in the following way:

$$r_x = \text{plurality of X-rows/plurality of pixels}$$

$$r_y = \text{plurality of Y-rows/plurality/of pixels.}$$

Advantageously, the increase in optical density function $f_S$ derives by norming in the following way:

$$f_S = G_{Rated} * (1.0 + S^*_{Eff})/100.$$

An apparatus for the implementation of the method is composed of a front end computer 10 for offering the picture signal values required for the pixel-by-pixel and line-by-line exposure of rastered surfaces on a recording material, of a raster generator 17 for converting the picture signal values into control signals for the recording unit of a recorder 12 required for the rastered recording, and of a correction stage 16 connected to the front end computer 10 and to the raster generator 17 for depositing a correction function according to which the picture signal values representing the nominal gray scale values ($G_{Rated}$) are corrected such that the real gray scale values ($G_{Actual}$) recorded on the recording material correspond to the nominal gray scale values ($G_{Rated}$). The apparatus is further characterized by a check raster generator 10' in the front end computer 10 for calling in the picture signal values required for the pixel-by-pixel and line-by-line exposure of check rasters (X-check raster; Y-check raster) on the recording medium provided for the later recording with the recorder 12, whereby the check rasters represent nominal gray scale values ($G_{xRated}$; $G_{yRated}$) by a film processor 13 for developing the check rasters exposed with the recorder 12, by a measuring means 14 for measuring the real gray scale values ($G_{xActual}$; $G_{yActual}$) of the exposed and developed check rasters 20 as surface coverage values, by an arithmetic unit 10'' in the front end computer 10 for calculating the overall increases in optical density ($S_{xControl}$; $S_{yControl}$) from the real gray scale values ($G_{xActual}$; $G_{yActual}$), from the nominal gray scale values ($G_{xRated}$; $G_{yRated}$), and for calculating the relative increases in optical density ($S_{xRel}$; $S_{yRel}$) of at least one pixel from the overall increases in optical density ($S_{xControl}$; $S_{yControl}$), and by a calibration computer 15 connected to the from end computer 10 and to the correction stage 16', and wherein with the calibration computer 15

—the effective overall increases in optical density ($S^*_{Eff}$) of the raster points allocated by the raster function are calculated for nominal gray scale values ($G_{Rated}$) of the overall gray scale value range between black and white, the increases being calculated from the relative increases in optical density ($S_{xRel}$; $S_{yRel}$) of a pixel 5 of the check rasters, taking the raster parameters (screen width, screen angle, raster function, positive/negative recording) for the later, rastered recording into consideration;

—the increase in optical density function $S^*_{Eff} = f_{S(GRated)}$ is calculated from the effective increases in overall optical density ($S^*_{Eff}$) that are acquired; and —the correction function (transfer function) $G_{Cor} = f_T$ ($G_{Rated}$) is acquired for deposit in the correction stage 16, being acquired from the increase in optical density function $S^*_{Eff} = f_S$ ($G_{Rated}$) by conversion for the compensation of the increase in optical density in the later exposure of the rastered surfaces.

The critical advantage of the method of the invention is that the steps to be manually undertaken are reduced to the density measurement for two check rasters as well as to the obligatory setting of density of the recording device. As a result thereof, the method can be automated to the farthest-reaching extent. What is considered another, critical advantage is that the updating of the transfer curve via the entire calibration process, given modification of one of the frequently changing raster parameters, can be omitted, as a result whereof the calibration precision is enhanced and the time required is considerably lowered.

BRIEF DESCRIPTION OF THE DRAWINGS

FIG. 1 is an X-check raster and a Y-check raster in the form of line patterns;

DESCRIPTION OF THE PREFERRED EMBODIMENTS

The method for exposure calibration of a recording device shall be set forth in detail below with reference to method steps [A] through [F].

In method step [A], an X-check raster and a Y-check raster in the form of line patterns oriented orthogonally relative to one another are exposed with the recording device on the recording material provided for the later useful exposure.

FIG. 1 shows a portion of an X-check raster (90°) whose lines 1 are oriented transversely relative to the recording direction 2, preferably perpendicularly relative to the recording direction 2, and which shows a portion of a Y-check raster (0°) whose lines 1 proceed in recording direction 2. The raster areas 3 of the X-check raster and of the Y-check raster each respectively represent a nominal rated gray scale value ($G_{xRated}$; $G_{yRated}$). The nominal rated gray scale values ($G_{xRated}$; $G_{yRated}$) of the raster areas 3 are respectively defined by the ratio of the thickness ($n_x$; $n_y$) of a line 1 relative to the line interval ($d_x$; $d_y$) according to equations [1]:

$$G_{xRated} = n_x/d_x$$
$$G_{yRated} = n_y/d_y. \qquad [1]$$

The nominal gray scale values ($G_{xRated}$; $G_{yRated}$) of the raster areas 3 can have any desired value between 0% and 100% area coverage of the theoretically possible, nominal gray scale value range, and can be identically or non-identically selected for the raster areas 3 of the two check rasters. It has proven advantageous for the evaluation of the check rasters to expose the raster areas 3 in an area coverage range from 20% through 40%, and preferably with an area coverage of 25%.

The lines 1 of the X-check raster and of the Y-check raster are exposed pixel-by-pixel with the assistance of the exposure unit of the recording device, whereby every line 1 is formed of at least one pixel row.

It has been shown in practice that a relevant, measurable increase in optical density—caused by the spot size of the exposure beam on the recording material, by the intensity of the recording beam that has been set, and by the nature of the recording material (film; photo paper)—only occurs given two or three pixels lying side-by-side, or overlapping one another. It has therefore proven expedient to form the lines 1 of the check rasters of respectively n=2 through 3 pixel rows in order to achieve a measurable increase in optical density in the check rasters. It has likewise proven expedient to only take pixel rows having ≧n pixels into consideration in the calculation of the increases in optical density in raster points.

Figure 2A:
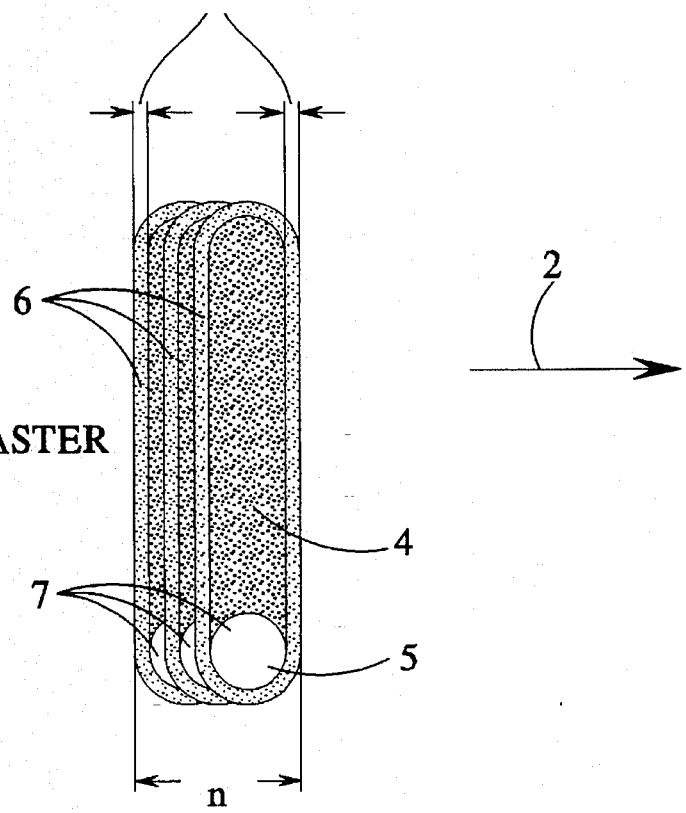
FIG. 2a is a line element from an X-check raster.
Figure 2B:
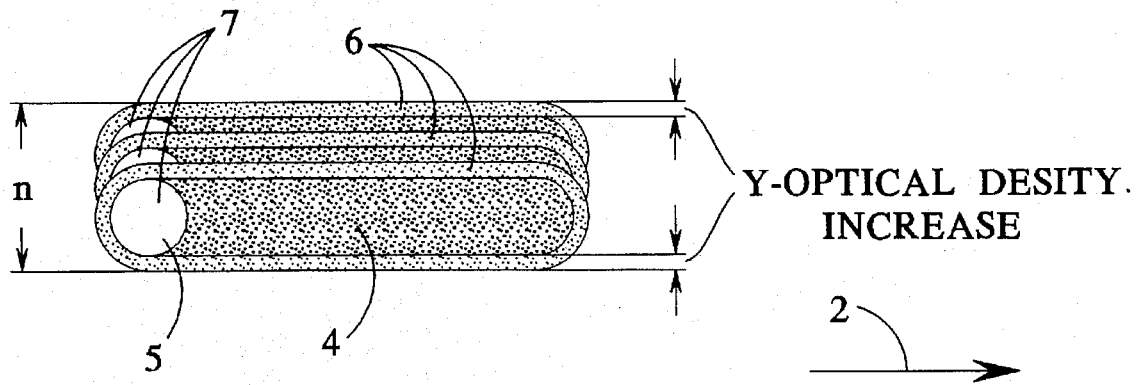
FIG. 2b is a line element from a Y-check raster.

FIG. 2a shows a portion of a line 1 from the X-check raster and FIG. 2b shows a corresponding portion of a line 1 from the Y-check raster.

In the illustrated example, the lines 1 are each respectively composed of three overlapping pixel rows 4. The thickness of a line 1 is 3 pixels 5 (line thickness n=3). Every pixel row 4 is recorded with a corresponding increase 6 in optical density due to the enlargement of the pixels 5. Only the increases in optical density of the edge rows contribute to the enlargement of the lines 1 for the increases in optical density of the individual pixel rows 4.

The increases in optical density of the check rasters can be separately calculated in X and Y directions from the exposed and developed check rasters in the following method steps [B] and [C].

The increase in X optical density can be selectively identified in the X-direction perpendicular to the line direction from the X-check raster via the measurement of the surface or area coverage of the raster area 3, since the corresponding increase in optical density in the line direction has no influence on the measurement of the area or surface coverage of the raster area 3 of the X-check raster.

The increase in Y-optical density in the Y-direction perpendicular to the line direction can likewise be calculated from the Y-check raster via the measurement of the area or surface coverage of the raster area 3, since the corresponding increase in optical density in the line direction has no influence on the measurement of the area or surface coverage of the raster area 3 of the Y-check raster.

In method step [B], the raster areas 3 of the exposed and developed X-check raster and Y-check raster are measured in terms of density in order to calculate the real gray scale values ($G_{xActual}$; $G_{yActual}$) that have in fact been exposed; and the overall increase in X optical density ($S_{xControl}$) and the overall increase in Y optical density ($S_{yControl}$) of the raster areas 3 are respectively calculated according to the equations [2] from the nominal gray scale values ($G_{xRated}$; $G_{yRated}$) and from the real gray scale values ($G_{xActual}$; $G_{yActual}$).

$$S_{xControl} = (G_{xActual} - G_{xRated})/G_{xRated}$$

$$S_{yControl} = (G_{yActual} - G_{yRated})/G_{yRated}. \quad [2]$$

In method step [C], the relative increase in X optical density ($S_{xRel}$) and the relative increase in Y optical density ($S_{yRel}$) for at least one pixel 5 of a pixel group, preferably for a pixel 5, are calculated from the overall increase in X optical density ($S_{xControl}$) and the overall increase in Y optical density ($S_{yControl}$) of the raster areas 3 of the check rasters, the increases being calculated with a correction factor according to equations [3].

$$S_{xRel} = S_{xControl} * n_x$$

$$S_{yRel} = S_{yControl} * n_y. \quad [3]$$

The correction factor takes the line thickness $n_x$ or $n_y$ in the check rasters into consideration and allows the overall increases in optical density that have been calculated to be reduced to the relative increases in optical density of a pixel. The correction factor is thereby acquired from the function of relative increase in optical density $-f(1/n)$ with n=line thickness in pixels, this being shown in FIG. 3.

The calculation of the relative increase in optical density of a pixel from the overall increase in optical density of the check rasters is based on the following considerations, whereby the calculation of the increase in optical density in one coordinate direction (X direction; Y direction) is considered.

A pixel row formed of n pixels (n=length of the pixel row) is considered. Every pixel of this pixel row generates a pixel blackening and a relative increase in optical density in the direction of the expanse of the pixel row. The overall optical density of the pixel row then derives according to equation [4].

$$n * \text{ pixel blackening} + \text{increase in optical density of the row} \quad [4]$$

Taking the fact into consideration that only the first and last pixel participates in the increase in optical density of the pixel row, the increase in optical density of the pixel row is equal to the relative increase in optical density of a pixel, and the overall optical density of the pixel row derives according to equation [5]

$$n * (\text{pixel blackening} + \text{relative increase in optical density }_{pixel}/n)[5]$$

It follows therefrom that the relative increase in optical density of a pixel row in the coordinate direction of the pixel row corresponds to the following function:

$$\text{relative increase in optical density}_{Row} = f(1/n) \quad [6]$$

The relative increase in optical density of a pixel row is thus inversely proportional to the length of the pixel row.

This functional relationship according to equation [6] can be transferred onto the check rasters and, as shall be shown later, can also be transferred onto a raster point.

A pixel row appears in the lines 1 of the check rasters. FIG. 2a and FIG. 2b each respectively show such a pixel row 7 that is composed of n=3 pixels 5. The plurality n of pixels of the pixel row 7 corresponds to the thickness (n) of the lines 1. The relative increase in optical density of a pixel 5 in the check rasters is thus inversely proportional to the line thickness (n) according to equation [7].

$$\text{relative increase in optical density} = f(1/n) \quad [7].$$

Figure 3:
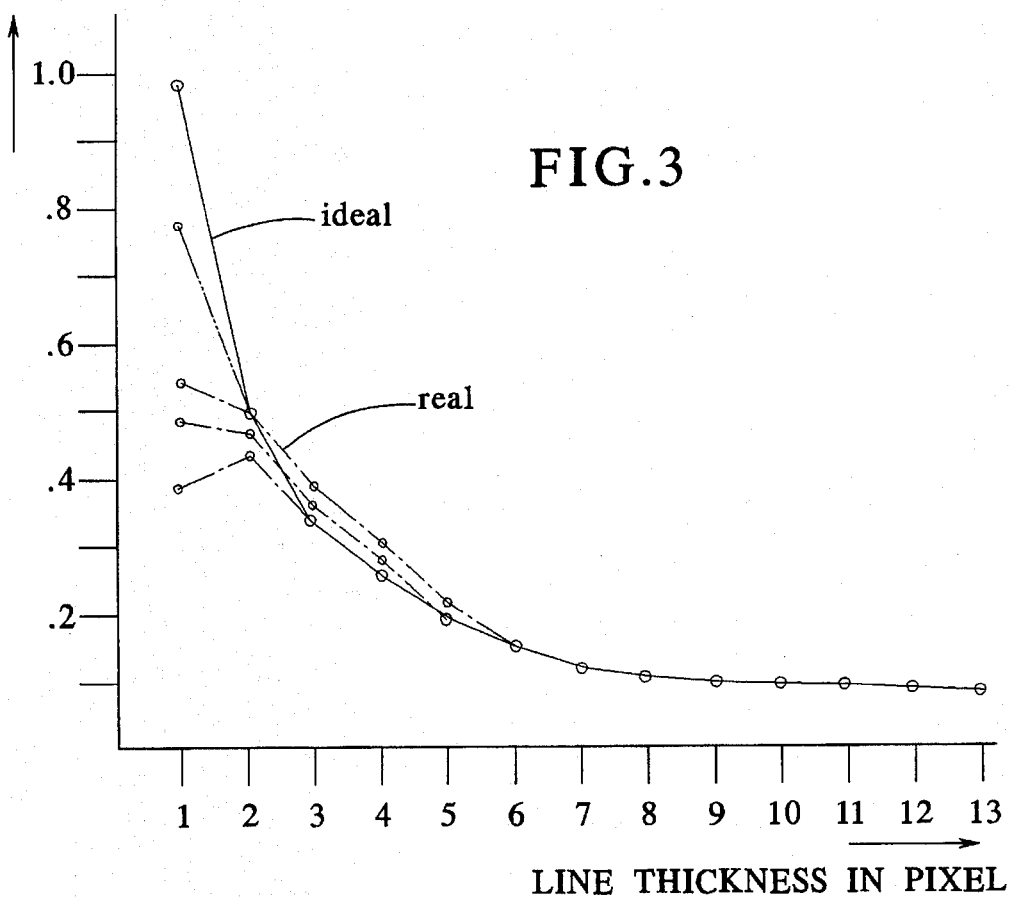
FIG. 3 is a graphic illustration of the increase in optical density function dependent on the line thickness in the check rasters.

FIG. 3 shows the relative increase in optical density as a function of the line thickness in pixels for the check grids given a constant, nominal surface or area coverage of 25% that is achieved given a line thickness of 3 pixels and a line interval of 12 pixels. This function is calculated (ideal curve), or is experimentally identified by measurements (real curve).

The corresponding increases in optical density of the raster points of the raster to be recorded can then be calculated according to method step [D] of the invention from the increases in optical density of a pixel according to method step [C] identified in the check rasters. The following observations can be made with respect thereto.

Figure 4A:
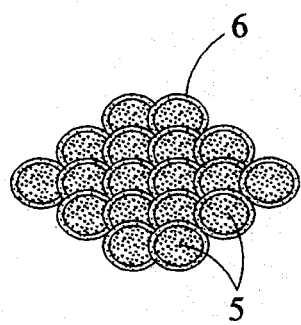
FIG. 4a is a graphic illustration for explaining the increase in optical density at a real raster point.

FIG. 4a shows a real raster point (pixel group) composed of a plurality of overlapping pixels 5, whereby each pixel 5 comprises an annular increase 6 in optical density. The pixels 5 that are produced by the exposure beam have the approximate shape of ellipses. The deviation from the ideal circular shape causes different increases in optical density in the X and in the Y directions which can be identified in differentiated fashion in the X and in the Y directions, exactly as in the case of the check rasters.

Figure 4B:
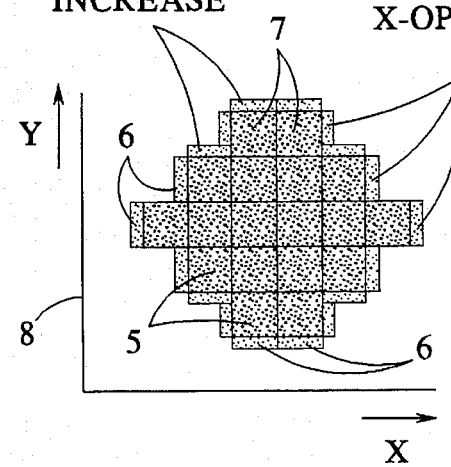
FIG. 4b is another graphic illustration for explaining the increase in optical density at an ideal raster point.

The real, elliptical pixel shape can be simplified with adequate precision to an ideal rectangular shape for the calibration process, this being shown in FIG. 4b.

FIG. 4b shows an idealized raster point of a raster. Without increase 6 in optical density, the raster point represents a specific, nominal gray scale value ($G_{Rated}$) and, with increase 6 in optical density, represents an enlarged, real gray scale value ($G_{Actual}$).

The raster point is constructed of rectangular pixels 5 oriented in the X and in the Y directions. Every pixel 5 can be addressed by coordinates (x, y) of an XY coordinate system 8. The pixels 5 are arranged in pixel rows 7 of different lengths that are oriented in the X and in the Y directions.

The increases in optical density of the individual pixel rows 7 can be separately acquired, whereas only the pixels lying at the edge of the corresponding pixel row (edge pixels) respectively participate in the increases 6 in optical density of the individual pixel rows 7, as is also the case given the lines 1 of the check rasters, and whereby the different lengths of the pixel rows 7 are taken into consideration by the function recited in equation [7], and as shown in FIG. 3.

The increases in optical density for the raster point are calculated by averaging from the increases in optical density calculated for the individual pixel rows 7, whereby the raster parameters such as screen width, screen angle, raster function, and positive/negative recording are taken into consideration.

What is to be understood here by raster function in general is the conversion of the gray scale values into raster points that have different sizes. The method according to which this conversion occurs is thereby of no consequence. For example, the conversion can be implemented with the assistance of a raster hill (threshold hill) of stored threshold matrices or of raster points that have already been stored in angled fashion.

The overall sequence shall be set forth below in method step [D]. The relative increases in optical density ($S_{xRel}$; $S_{yRrel}$) acquired in method step [C] thereby form the basis for the effective increases in optical density of the raster point to be calculated according to method step [D], since, as already set forth, the increase in optical density function=f (1/n) according to equation [7] is valid both for the increases in optical density given the lines of the check rasters as well as for the increases in optical density given the pixel rows within the raster points.

In method step [D], the effective increases in optical density in the X direction and in the Y direction are calculated and the effective increases in overall optical density for the raster points are calculated therefrom, whereby only pixel groups or pixel rows having ≧n pixels are taken into consideration.

The following is valid for every pixel row 7 in the X and in the Y directions of a raster point, given a screen angle of β=0°.

According to equations [8], the increase in optical density ($S_{xRow}$; $S_{yRow}$) of a pixel row 7 derives from the relative increases in optical density ($S_{xRel}$; $S_{yRel}$) of a pixel 5 and from the plurality ($n_x$; $n_y$) of pixels 5, or from the length of this pixel row 7. The lengths of the pixel rows 7 are thereby dependent on the screen width (raster frequency) and the raster point sizes over the raster function of the raster employed.

$$S_{xRow} = S_{xrel} * 1/n_x$$

$$S_{yRow} = S_{yRel} * 1/n_y. \quad [8]$$

A raster point is typically composed (see FIG. 4b) of a plurality of pixel rows 7 having different lengths in the X and in the Y directions. The increases in optical density in the X and in the Y directions for the raster point are calculated from the averages of the increases in optical density ($S_{xRow}$; $S_{yRow}$) of the individual pixel rows 7. The averaging is implemented with the assistance of shape factors ($r_x$; $r_y$).

According to equations [9], the increases in optical density ($S_x$; $S_y$) in the X and in the Y directions of a raster point therefore derive from the relative increases in optical density ($S_{xRel}$; $S_{yRel}$) and from the shape factors ($r_x$, $r_y$) that are dependent on the contour of the raster point, i.e. on the raster function and, potentially on the screen angle (β) of the rotated raster.

The shape factors ($r_x$; $r_y$) are the respective ratios from the plurality of pixel rows 7 in the X or in the Y directions (X rows; Y rows), and the overall plurality of pixels 5 in the raster point. Only pixel groups having ≧n pixels are thereby taken into consideration, i.e. only those pixels 5 in the pixel row 7 are evaluated for the plurality of pixels 5 that lie in a pixel sequence of ≧n in the evaluated coordinate (x; y) of the XY coordinate system 8 (FIG. 4b).

$$S_x = S_{xRel} * r_x$$

$$S_y = S_{yRel} * r_y \quad [9]$$

with shape factor $r_x$=plurality of x rows/plurality of pixels and
with shape factor $r_y$=plurality of Y rows/plurality of pixels.

Given a raster having asymmetrical raster points (for example, ellipses, lines, etc.) turned by a screen angle (β), the plurality of X rows and of Y rows as well as the contour of the raster points, and thus the shape factors ($r_x$; $r_y$), vary. The change in the raster point contour, however, is so slight that it can be left out of consideration in the calculation of the increases in optical density without serious losses of precision.

Taking the screen angle (β) of a rotated raster into consideration, the modified shape factors ($r^*_x$; $r^*_y$) derive according to equations [10] whereby only the raster rotation in one quadrant is taken into consideration.

$$r^*_x = (r_y * \text{angle}/90°) + r_x * (1-\text{angle}/90°)$$

$$r^*_y = (r_x * \text{angle}/90°) + r_y * (1-\text{angle}/90°) \quad [10]$$

with angle=screen angle β modulo 90°.

According to equations [11], the effective increases in optical density ($S_{xEff}$; $S_{yEff}$) in X and in Y direction for a raster point, taking the screen angle (β) into consideration, are:

$$S^*_{xEff} = S_{xRel} * r^*_x$$

$$S^*_{yEff} = S_{yRel} * r^*_y \quad [11]$$

and the effective overall increase in optical density ($S^*_{Eff}$) of the raster point according to equation [12] is:

$$S^*_{Eff} = S^*_{xEff} + S^*_{yEff} \quad [12]$$

The increase in optical density function is formed in method step [E].

For that purpose, the function $S^*_{Eff} = f(G_{Rated})$ for nominal gray scale values of the entire gray scale value arranged between black and white is first calculated taking the current raster parameters (screen width, screen angle, and raster function) for the later useful exposure into consideration. Selected, nominal gray scale values ($G_{Rated}$) of the theoretically possible gray scale range between 0 and 100%, for example, gray scale values having step widths of 5%, are called in. A corresponding, imaginary model raster point (FIG. 4b) is generated for every gray scale value ($G_{Rated}$) that is called in, the shape and size of this imaginary model raster point being dependent on the respective, nominal gray scale value via the raster function. Which raster method is employed to undertake the conversion of the nominal gray scale values into raster points thereby plays no part.

The effective overall increase in optical density $S^*_{Eff}$ is then calculated for every generated, model raster point according to the equations [8] through [12] recited in method step [D], taking the raster parameters into consideration, whereby the screen width, the screen angle, and the raster function influence the plurality of pixels in the pixel rows and influence the shape factors.

A potential setting of the recorder to negative recording is taken into consideration by an arithmetic conversion of the respective black/white content of the pixels 5.

The identified relationships between effective overall increases in optical density $S^*_{Eff}$ and nominal gray scale values ($G_{Rated}$) are retained in table form.

The increase in optical density function $f_S$ then derives by norming from $$f_S = G_{Rated} * (1.0 + S^*_{Eff})/100.$$

In method step [F], the correction function (transfer function) $F_T$ is formed by conversion from the increase in optical density function $f_S$ and is stored for the later exposure. During the exposure, the nominal gray scale values ($G_{Rated}$) are then converted according to the transfer function $f_T$ into corrected gray scale values ($G_{Cor}$) such that the gray scale values that are in fact recorded correspond to the nominal gray scale values.

Figure 5:
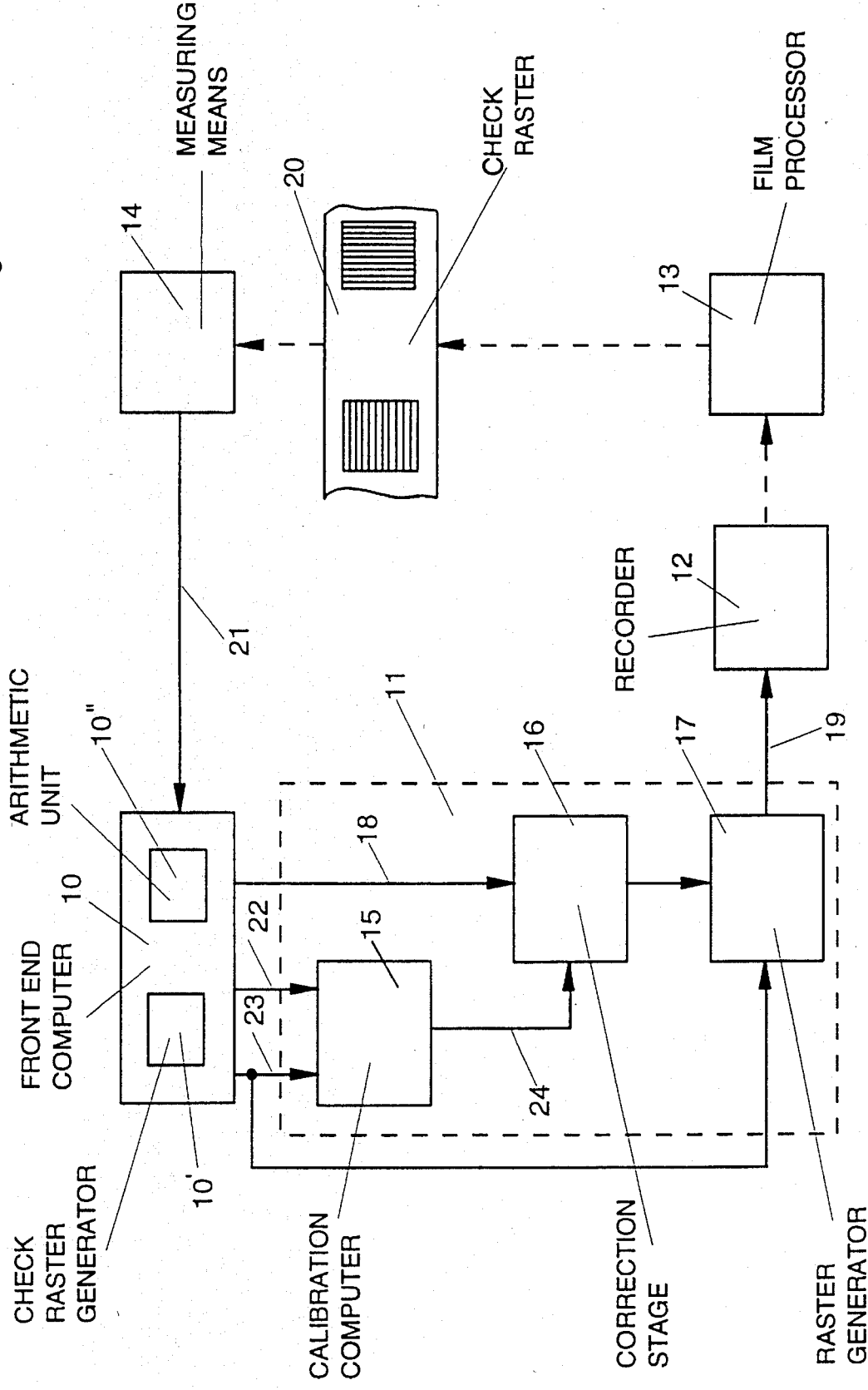
FIG. 5 is a block circuit diagram of an apparatus for exposure calibration.

FIG. 5 shows a fundamental exemplary embodiment of an apparatus for the implementation of the exposure calibration in a recorder or exposer.

The apparatus is essentially composed of a front end computer 10, of a raster image processor (RIP) 11, of a recorder 12, of a film processor 13 and of a measuring means 14. Among other flings, the front end computer 10 contains a check raster generator 10' and an arithmetic unit 10". The raster image processor 11 comprises a calibration computer 15, a correction stage 16, and a raster generator 17.

The image signal values required for the exposure of the X-check raster and of the Y-check raster according to method step [A] are generated in the check raster generator 10' and are supplied to the raster generator 17 via a line 18 and via the correction stage 16, which is initially inactive for this purpose. The raster generator 17 generates control signals for the exposure of the check rasters, these signals being communicated to the recorder 12 via a line 19. The recorder 12 undertakes the pixel-by-pixel and line-by-line exposure of the check rasters on the recording material, whereby the control signals switch the exposure beam of the recorder 12 on and off. The exposed check rasters are developed in the film processor 13. The check rasters 20 exposed with the recorder 12 and developed in the film processor 13 are measured in terms of density in the measuring means 14 according to method step [B]. The gray scale values ($G_{xActual}$; $Gy_{Actual}$) measured as surface or area coverage values are transmitted to the front end computer 10 via a line 21, or are manually entered into the front end computer 10.

The relative increases in optical density ($S_{xRel}$; $Sy_{Rel}$) are calculated according to method steps [B] and [C] in the arithmetic unit 10" of the front end computer 10, these increases being calculated from the measured surface or area coverage values and from the nominal gray scale values ($G_{xRated}$; $G_{yRated}$) and are transferred to the calibration computer 15 via a line 22 and are stored in the latter. The plurality n of pixels to be evaluated are also forwarded to the calibration computer 15 via the line 22.

This transfer always occurs when one of the parameters such as type of recorder, resolution of the recorder, density setting at the recorder, changes.

Together with the set, the current raster parameters (screen width, screen angle, raster function and positive/negative recording) are communicated from the front end computer 10 to the calibration computer 15 via a line 23 and to the raster generator 17. The transfer function $f_T$ is then calculated in the calibration computer 15 according to method steps [D] through [F] and is input into the correction stage 16 via a line 24, the exposure calibration for the current raster to be recorded being thus concluded.

During the useful exposure, the image signal values required for the exposure are then edited in the front end computer 10 and are supplied via the line 18 to the correction stage 16 in which they are corrected according to the transfer function $f_T$.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for exposure calibration of a recording device for pixel-by-pixel and line-by-line exposure of rastered areas of a later raster recording by raster points in accordance with a raster point contour known as a raster function on a recording material with an exposure unit input with image signal values wherein image signal values representing nominal gray scale values to be recorded are corrected so that real gray scale values recorded on the recording material correspond to the nominal gray scale values, comprising the steps of:

providing first and second check rasters each having parallel spaced lines, lines of the first check raster running in a direction perpendicular to lines of the second check raster, and each check raster representing at least one nominal gray scale value;

exposing the first and second check rasters pixel-by-pixel and line-by-line on the recording material provided for said later rastered recording;

measuring real gray scale values of the check rasters exposed on the recording material as surface coverage values;

calculating overall increases in optical density arising in the exposed check rasters from the real gray scale values of the check rasters and from the nominal gray scale values;

acquiring relative increases of optical density of at least one pixel from said overall increases in optical density of the check rasters;

calculating effective overall increases in optical density of the raster points allocated by said raster function for nominal gray scale values of an entire gray scale range between black and white, the overall increases being calculated from said relative increases in optical density of the at least one pixel of the check rasters taking raster parameters provided for said later rastered recording into consideration;

calculating an increase in an optical density function from said effective overall increases in optical density that are acquired;

acquiring a correction function by conversion from said increase in optical density function: and employing said correction function as a transfer function to correct the image signal values to be recorded so that the real gray scale values correspond to the nominal gray scale values.

2. A method according to claim 1 including the steps of:

aligning the lines of the first check raster perpendicular relative to an exposure line direction; and aligning the lines of said second check raster in said exposure line direction.

3. A method according to claim 2 including the steps of:

separately identifying in the line direction and perpendicularly thereto an overall increase in optical density that has arisen in the exposed check rasters by calculating the overall increase in optical density in the line direction from a broadening of the lines of the first check raster; and calculating the overall increase in optical density perpendicular to the line direction from a broadening of the lines of the second check raster.

4. A method according to claim 1 including the step of respectively identifying said at least one nominal gray scale value represented by the respective first and second check rasters by a ratio of a thickness of a line of the respective check raster relative to a line interval of the respective check raster.

5. A method according to claim 1 including the step of constructing every line of the first and second check rasters of at least one pixel row.

6. A method according to claim 5 including the step of providing every line of the first and second check rasters with a thickness of two to three pixel rows in a direction perpendicular to a direction of the line.

7. A method according to claim 1 including the step of calculating said overall increases in optical density $S_{Control}$ from said real gray scale values $G_{Actual}$ and from said nominal gray scale values $G_{Rated}$ according to the following equation:

$$S_{Control} = (G_{Actual} - G_{Rated})/G_{Rated}.$$

8. A method according to claim 1 including the step of calculating said relative increases of optical density $S_{Rel}$ of a pixel with assistance of a correction factor which takes a thickness n of lines of the respective first and second check rasters into consideration, said relative increases being calculated from said overall increases in optical density $S_{control}$ of the respective check raster according to the following equation:

$$S_{Rel} = S_{control} * \text{line thickness n}.$$

9. A method according to claim 1 wherein said raster parameters taken into consideration include the parameters screen width, screen angle, raster function, and positive/negative recording.

10. A method for exposure calibration of a recording device for pixel-by-pixel and line-by-line exposure of rastered areas of a later raster recording by raster points in accordance with a raster point contour known as a raster function on a recording material with an exposure unit input with image signal values wherein image signal values representing nominal gray scale values to be recorded are corrected so that real gray scale values recorded on the recording material correspond to the nominal gray scale values, comprising the steps of:

exposing a check raster representing at least one nominal gray scale value pixel-by-pixel and line-by-line on the recording material provided for said later rastered recording, said at least one nominal gray scale value represented by the check raster corresponding to a surface coverage value in a range from 20% to 40% lying within a range of surface coverage values from 0% representing white to 100% representing black;

measuring real gray scale values of the check raster exposed on the recording material as surface coverage values;

calculating overall increases in optical density arising in the exposed check raster from the real gray scale values of the check raster and from the nominal gray scale values;

acquiring relative increases of optical density of at least one pixel from said overall increases in optical density of the check raster;

calculating effective overall increases in optical density of the raster points allocated by said raster function for nominal gray scale values of an entire gray scale range between black and white, the overall increases being calculated from said relative increases in optical density of the at least one pixel of the check raster taking raster parameters provided for said later rastered recording into consideration;

calculating an increase in an optical density function from said effective overall increases in optical density that are acquired;

acquiring a correction function by conversion from said increase in optical density function; and employing said correction function as a transfer function to correct the image signal values to be recorded so that the real gray scale values correspond to the nominal gray scale values.

11. A method according to claim 10 including the step of having said nominal gray scale value represented by the check raster correspond to a surface coverage value of 25%.

12. A method for exposure calibration of a recording device for pixel-by-pixel and line-by-line exposure of rastered areas of a later raster recording by raster points in accordance with a raster point contour known as a raster function on a recording material with an exposure unit input with image signal values wherein image signal values representing nominal gray scale values to be recorded are corrected so that real gray scale values recorded on the recording material correspond to the nominal gray scale values, comprising the steps of:

exposing first and second check rasters in the form of line patterns each representing at least one nominal gray scale value pixel-by-pixel and line-by-line on the recording material provided for said later rastered recording, lines of the first check raster being aligned perpendicular to a line direction, and lines of the second check raster being aligned in said line direction;

measuring real gray scale values of the check rasters exposed on the recording material as surface coverage values;

calculating overall increases in optical density arising in the exposed check raster from the real gray scale values of the check rasters and from the nominal gray scale values;

acquiring relative increases of optical density of at least one pixel from said overall increases in optical density of the check rasters;

calculating effective overall increases in optical density of the raster points allocated by said raster function for nominal gray scale values of an entire gray scale range between black and white, the overall increases being calculated from said relative increases in optical density of the at least one pixel of the check rasters taking raster parameters provided for said later rastered recording into consideration;

generating corresponding raster points from pixels wherein the pixels are arranged in individual pixel rows oriented in said line direction and perpendicularly thereto;

identifying effective increases in optical density of the raster point from averages of increases in optical density of the individual pixel rows and from the relative increases in optical density, said effective increases being calculated by taking a respective screen angle into consideration;

calculating an effective overall increase in optical density of the raster point by addition of the effective increases in optical density of said at least one pixel;

calculating an increase in an optical density function from said effective overall increases in optical density that are acquired;

acquiring a correction function by conversion from said increase in optical density function; and employing said correction function as a transfer function to correct the image signal values to be recorded, so that the real gray scale values correspond to the nominal gray scale values.

13. A method according to claim 12 including the steps of:

respectively calculating the effective increases in optical density $S^*_{xEff}$, $S^*_{yEff}$ of the raster points from the increases in optical density of the individual pixel rows and from the relative increases in optical density $S_{xRel}$, $S_{yRel}$ of said at least one pixel, the effective increases being calculated with assistance of shape factors $r^*_x$, $r^*_y$ in accordance with the following equations:

$$S^*_{xEFF} = S_{xRel} * r^*_x$$

$$S^*_{yEFF} = S_{yRel} * r^*_y$$

whereby the shape factors $r^*_x$, $r^*_y$ take the respective screen angle into consideration in the following way:

$$r^*_x = (r_y * \text{angle}/90°) + r_x * (1 - \text{angle}/90°)$$

$$r^*_y = (r_x * \text{angle}/90°) + r_y * (1 - \text{angle}/90°),$$

with angle=screen angle modulo 90°; and respectively calculating shape factors $r_x$, $r_y$ from the plurality of pixel rows in the line direction and perpendicularly thereto and from a plurality of pixels that devolve onto the raster point, the shape factors $r_x$, $r_y$ being calculated in the following way:

$r_x$=plurality of X rows/plurality of pixels $r_y$=plurality of Y rows/plurality of pixels.

14. A method for exposure calibration of a recording device for pixel-by-pixel and line-by-line exposure of rastered areas of a later raster recording by raster points in accordance with a raster point contour known as a raster function on a recording material with an exposure unit input with image signal values wherein image signal values representing nominal gray scale values to be recorded are corrected so that real gray scale values recorded on the recording material correspond to the nominal gray scale values, comprising the steps of exposing a check raster representing at least one nominal gray scale value pixel-by-pixel and line-by-line on the recording material provided for said later rastered recording;

measuring real gray scale values of the check raster exposed on the recording material as surface coverage values;

calculating overall increases in optical density arising in the exposed check raster from the real gray scale values of the check raster and from the nominal gray scale values;

acquiring relative increases of optical density of at least one pixel from said overall increases in optical density of the check raster;

calculating effective overall increases in optical density of the raster points allocated by said raster function for nominal gray scale values of an entire gray scale range between black and white, the overall increases being calculated from said relative increases in optical density of the at least one pixel of the check raster taking raster parameters provided for said later rastered recording into consideration;

calculating an increase in an optical density function from said effective overall increases in optical density that are acquired;

deriving by norming said increase in said optical density function $f_S$ in the following way:

$$f_S = G_{Rated} * (1.0 + S^*_{Eff})/100$$

where $G_{Rated}$ is said nominal gray scale value and $S^*_{Eff}$ is said effective overall increase in optical density of said raster points;

acquiring a correction function by conversion from said increase in optical density function; and employing said correction function as a transfer function to correct the image signal values to be recorded so that the real gray scale values correspond to the nominal gray scale values.

15. An apparatus, comprising:

front end computer means for offering image signal values required for pixel-by-pixel and line-by-line exposure of rastered areas by raster points in accordance with a raster point contour known as a raster function on a recording material;

raster generator means for converting the image signal values into control signals for an exposure unit of a recorder means for rastered recording;

correction unit means connected to said front end computer means and to said raster generator means for depositing a correction function according to which image signal values representing nominal gray scale values are corrected such that real gray scale values recorded on the recording material correspond to the nominal gray scale values;

a check raster generator means in said front end computer means for calling in the image signal values required for the pixel-by-pixel and line-by-line exposure of first and second check rasters on the recording material provided for a later rastered recording with said recorder means, the check rasters each representing at least one nominal gray scale value;

the first and second check rasters each having parallel spaced lines and wherein lines of the first check raster run in a direction perpendicular to lines of the second check raster;

film processor means for developing the check rasters exposed with the recorder;

measuring means for measuring the real gray scale values of an exposed and developed check raster as surface coverage values;

arithmetic unit means in said front end computer means for calculating overall increases in optical density from the real gray scale values and from the nominal gray scale values and for calculating relative increases in optical density of at least one pixel from said overall increases in optical density; and calibration computer means connected to said front end computer means and to said correction stage means, said calibration computer means having
means for calculating effective overall increases in optical density of the raster points allocated by the raster function for nominal gray scale values of an overall gray scale value range between black and white, the effective overall increases being calculated from said relative increases in optical density of a pixel of the respective first and second check rasters taking raster parameters provided for said later rastered recording into consideration,
means for calculating an increase in optical density function from acquired, effective overall increases in said effective overall increases in optical density, and
means for acquiring a correction function used as a transfer function which is deposited in said correction unit means by conversion from said increase in optical density function for compensation of an increase in optical density in the later exposure of the rastered areas.

16. A method for exposure calibration of a recording device for pixel-by-pixel and line-by-line exposure of rastered areas on a recording material, comprising the steps of:

calculating a correction function and correcting picture signal values that are to be recorded and which represent nominal gray scale values according to the correction function so that real gray scale values that are recorded correspond to the nominal gray scale values; and for calculating the transfer function providing first and second check rasters each having a line pattern formed of a plurality of spaced parallel lines, lines of the first check raster running in a direction perpendicular to lines of the second check raster;

exposing the first and second check rasters pixel-by-pixel and line-by-line on the recording material and measuring surface coverage values of the respective check rasters, calculating relative increases in the optical density of the respective check rasters from the measured surface coverage values, calculating an effective increase in optical density of a picture element from the relative increases in optical density of the respective check rasters, the raster parameters provided for the recording being taken into consideration, calculating an increase in the optical density function for the nominal gray scale values of the gray scale range, and calculating the correction function from the increase in the optical density function.

17. A method for exposure calibration of a recording device for pixel-by-pixel and line-by-line recording by exposing rastered areas on a recording material with an exposure unit, wherein said exposure unit is controlled by an image signal representing nominal gray scale values to be exposed on said recording material in the form of raster points of different sizes, wherein a raster function determines a size of the raster points in dependence on said nominal gray scale values, and wherein the image signal is corrected by said exposure calibration so that real gray scale values exposed on said recording material correspond to said nominal gray scale values, comprising the steps of:

exposing first and second check rasters point-by-point and line-by-line on said recording material, said check rasters each having a line pattern representing a nominal gray scale value, lines of said first check raster being aligned substantially perpendicular to said recording lines and lines of said second check raster being aligned substantially in a direction of said recording lines;

measuring the real gray scale values of the first and second check rasters exposed on said recording material as surface coverage values;

calculating overall density increase values arising in the exposed check rasters from the measured real gray scale values and the nominal gray scale values;

calculating relative density increase values of at least one pixel in said check raster from said overall density increase values;

calculating from said relative density increase values of said check rasters an effective density increase value for each of a plurality of raster points taking into consideration raster parameters for a later recording, the plurality of raster points being of different sizes, said different sizes of said raster points representing nominal gray scale values of an entire gray scale range between black and white in accordance with said raster function;

calculating a density increase function from said effective density increase values of the raster points generated and from said nominal gray scale values within said entire gray scale range;

converting said density increase function into a correction function; and employing said correction function to correct said image signal so that the real gray scale values recorded on said recording material correspond to the nominal gray scale values.

18. A method for exposure calibration of a recording device for pixel-by-pixel and line-by-line recording by exposing rastered areas on a recording material with an exposure unit, wherein said exposure unit is controlled by an image signal representing nominal gray scale values to be exposed on said recording material in the form of raster points of different sizes, wherein a raster function determines a size of the raster points in dependence on said nominal gray scale values, and wherein the image signal is corrected by said exposure calibration so that real gray scale values exposed on said recording material correspond to said nominal gray scale values, comprising the steps of:

exposing first and second check rasters point-by-point and line-by-line on said recording material, said check rasters each having a line pattern representing with each line pattern a single nominal gray scale value, lines of said first check raster being aligned substantially perpendicular to said recording lines and lines of said second check raster being aligned substantially in a direction of said recording lines;

measuring the real gray scale values of the first and second check rasters exposed on said recording material as surface coverage values;

calculating overall density increase values arising in the exposed check rasters from the measured real gray scale values and the nominal gray scale values;

calculating relative density increase values of at least one pixel in said check raster from said overall density increase values;

calculating from said relative density increase values of said check rasters an effective density increase value for each of a plurality of raster points taking into consideration raster parameters for a later recording, calculating a density increase function from said effective density increase values;

converting said density increase function into a correction function; and employing said correction function to correct said image signal so that the real gray scale values recorded on said recording material correspond to the nominal gray scale values.

* * * * *